United States Patent Office 2,744,882
Patented May 8, 1956

2,744,882
UNSYMMETRICAL DIPHENYLOL METHANES

Howard L. Bender and Alford G. Farnham, Bloomfield, and John W. Guyer, Verona, N. J., assignors, by mesne assignments, to Union Carbide and Carbon Corporation, a corporation of New York No Drawing. Application January 26, 1949,
Serial No. 72,992

7 Claims. (Cl. 260—47)

This invention relates to unsymmetrical diphenylol methane compounds and to their production, such compounds being of interest in the manufacture of resins by reaction with aldehydes.

More particularly the invention relates to unsymmetrical diphenylol methane compounds obtained by condensing saligenin (orthohydroxybenzyl alcohol) with substituted phenols having at least one reactive position ortho or para to a phenolic hydroxyl and one or more univalent radicals, such as alkyl, cycloalkyl, aryl, alkenyl, alkoxy, or additional phenolic hydroxyl groups in replacement of hydrogen atoms of the benzene nucleus. Exemplary of the alkyl and cycloalkyl substituted phenols are the cresols, xylenols, 2,3,5,6-tetra methyl phenol, ethyl and diethyl phenols, butyl and dibutyl phenols, amyl phenols, octyl phenols, para cyclohexyl phenol and 2,6-dicyclohexyl phenol. Paraphenyl phenol and 3,5-diphenyl phenol typify the aryl substituted phenols. Crotyl phenol, allyl phenol, o-vinyl phenol, 1,3-diallyl phenol and cardanol (a phenol obtained by heat-treatment of cashew nut oil) are illustrative of phenols having alkenyl radicals, i. e. a univalent radical having a carbon to carbon double bond. Exemplary of mono and poly alkoxy substituted phenols are the isomeric methoxy phenols, ethoxy phenols and butoxy phenols; higher radicals are for instance 2-ethyl hexoxy phenol; whereas pyrogallol 1,3-dimethyl ether and antiarol are illustrated of polyalkoxy phenols. Examples of phenols containing more than one phenolic hydroxyl group are resorcinol, pyrogallol, phloroglucinol, catechol and hydroquinone. Moreover phenols having different radicals on the benzene nucleus are also suitable, for example, orcinol, methyl phloroglucinol, 4,6-mesorcinol, 4,6-diethyl orcinol, 2-5-6-trimethyl resorcinol, 4-ethyl-5,6-dimethyl resorcinol, eugenol, iso-eugenol and 3-ethoxy-4-hydroxy-1-methyl benzene.

The condensation reaction of saligenin with a monocyclic phenol of the aforedescribed group is pictured as follows:

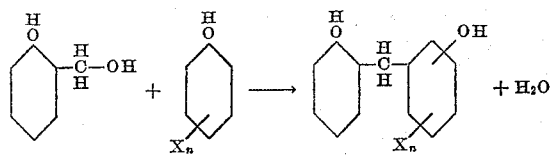

wherein each X is a monovalent radical from the group alkyl, cycloalkyl, aryl, alkenyl, alkoxy, or hydroxy, $n$ is a whole number of 1 to 4, and the OH in the substituted phenyl ring is in one of the positions 2, 4 or 6 to the nuclear carbon atom attached to the methylene carbon atom.

By-products of the reaction are water, saliretin resin which is an indefinite mixture of chain anhydrides of saligenin and novolak resins of two types, as for example three ring structure such as:

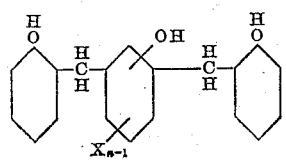

when the substituted phenol has at least two reactive positions. The second type of novolak resins found as a by-product has the probable structure:

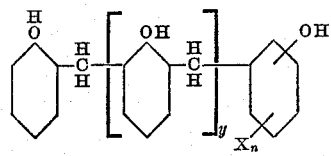

where $y$ is an integer from 1 to about 40. This type of novolak resin is produced with all of the aforementioned substituted phenols.

The yields of the desired unsymmetrical diphenylol methanes are promoted by reacting saligenin with excess molar quantities of the substituted phenol and preferably between about three to ten moles of the phenol to one mole of saligenin. The yields are further promoted by conducting the reaction at a pH between 4.0 and 7.0. Catalysts effective in maintaining a buffered pH between 4.0 and 7.0 accelerate the reaction and improve the yields. Preferred catalysts of this type are the alkali and alkaline earth oxides and hydroxides such as sodium hydroxide, calcium hydroxide, magnesium oxide, the oxides and hydroxides of the amphoteric metals zinc and aluminum and the organic salts of these metals for example sodium phenate, sodium acetate, zinc citrate, zinc glucinate, zinc acetate, magnesium valerate and aluminum laurate. Reacting the phenol with saligenin at a temperature between 100° C. and 200° C. and preferably between 160° C. and 170° C. favors the desired reaction and enables water of condensation to be removed as rapidly as it is formed. At a temperature between 160° C. and 170° C. a half hour reaction is sufficient to attain a maximum yield of unsymmertical diphenylol methane.

Instead of pure saligenin, an impure reaction mixture containing saligenin in admixture with diphenylol methanes and polyphenylol methanes can be used in the reaction with the substituted phenol. Such reaction mixtures are those obtained by condensing phenol in excess molar quantities with formaldehyde.

Isolation of the unsymmetrical diphenylol methanes is accomplished by crystallization or distillation at pressures below atmospheric to remove unreacted substituted phenol from the reaction mass. The residue is then recrystallized or distilled at extremely low pressures of the order of 1 mm. pressure. The distillate from the residue can be purified by repeated crystallization from a solution of the distillate in a solvent, as for example, a 50% solution of acetic acid in water, until compounds of constant melting point are isolated.

The following examples are illustrative of the production of specific unsymmetrical diphenylol methane compounds:

*Example 1*

Phenol unites by addition with formaldehyde to give saligenin (2-hydroxyphenyl carbinol or orthohydroxybenzyl alcohol) M. P. 86° C. molecular weight 124.13; it is a very reactive chemical. Saligenin 24.8 grams (⅕ mole) and ortho cresol, 108 grams (1 mole) were mixed (pH of mixture 4 to 5) and heated to 160–170° C. for thirty minutes, allowing water to escape through a condenser heated to 100° C. The reacted mixture was next distilled at pressure below atmospheric to remove unreacted orthocresol. The residue was then distilled at 170–188° C. at 1 mm. mercury pressure to yield 19.8 grams of distillate (46.3% yield). There were left in the pot 17.8 grams of residue, mostly in the form of saliretin resin. A small amount of resinous distillate was also obtained.

Crystallization of the main distillate from a 50% solution of acetic acid in water gave 13.6 grams of needles of 2,2'-dihydroxy-3'-methyldiphenyl methane, M. P. 123–124° C., molecular weight 214 and having the structure:

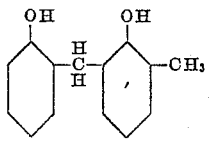

This crystalline material was tested with hexamethylenetetramine for heat-hardening properties by adding thereto 15% by weight of hexamethylenetetramine and heating the mixture as a film to 160° C. The time in seconds to become infusible at 160° C. was recorded as 130 seconds. The infusible film when heated to higher temperatures carbonized without melting.

The distillable resin noted above seemed to contain a trace of a diphenylol which was not obtained in other than resinous form. This may be the isomeric 2,4'-dihydroxy-3'-methyldiphenyl methane.

The crystalline 2,2'-dihydroxy-3'-methyldiphenyl methane was reacted with formaldehyde at a ratio of 1 mole crystals to 2 moles formaldehyde and in the presence of 10.5 grams NaOH and water to make a 50% solution. The mass was heated to 100° C. and the liquid resin resulting from the reaction became infusible when heated for 13 minutes at 100° C.

The structure of the 2,2'-dihydroxy-3'-methyldiphenyl methane crystals was proven as follows: Five grams of the crystals were heated and distilled at atmospheric pressure collecting the distillate. The distillate was treated with excess NaOH aqueous solution and subjected to steam distillation. An insoluble oil came over with the water, was separated from the water and recrystallized from methanol. Crystals of 4 methyl xanthene needles were obtained and this product is the cyclic anhydride of the hitherto unknown 2,2' - dihydroxy - 3' - methyldiphenyl methane.

*Example 2*

Saligenin was reacted with paracresol to yield an unsymmetrical diphenylol methane. Saligenin 12.4 grams, p-cresol 58.6 grams, water 5.0 grams, and ZnO 0.2 grams were mixed; the mixture having a pH of 7.0 was slowly heated to 160–170° C. and distilled under reduced pressure. After unreacted para cresol was removed, 11.4 grams of distillate was obtained which recrystallized from dilute aqueous acetic acid gave crystals of M. P. 96–97° C. which was identified as 2,2'-dihydroxy-5'-methyl diphenyl methane having the tautomeric structure:

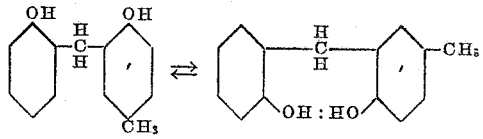

No isomers of this compound are believed possible because the meta positions are not reactive. This crystalline material was reacted with 15% hexamethylenetetramine at 160° C., the resultant resinous reaction product heat-hardening in 150 seconds at 160° C. to an infusible mass. The crystals reacted with formaldehyde at 100° C. and in the presence of NaOH as in Example 1 yielded a liquid resin which became infusible in 22 minutes at 100° C. The structure of the crystal material was proven by dehydrating it to the cyclic 2-methyl xanthene having the structure:

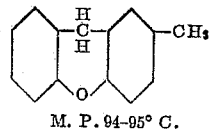

M. P. 94–95° C.

It does not heat-harden to an infusible mass when reacted with hexamethylenetetramine. The resin hardening speeds of the formaldehyde and hexamethylenetetramine reaction products with the 2,2'-dihydroxy-5'-methyl diphenyl methane reflects the fact that of its three open ortho and para positions, two are ortho and only one is the rapid para position.

*Example 3*

Saligenin (M. P. 84–86° C.) 24.8 grams (⅕ mole) was mixed with meta cresol 108. grams (1 mole) and heated 30 minutes at 160–170° C.; then the unreacted meta cresol was distilled off under atmospheric pressure. The residue was then distilled collecting 30.2 grams at 178–188° C. and 1 mm. pressure. The distillate was resinous, and when reacted with 15% hexamethylenetetramine it heat-hardened to an infusible mass in 90 seconds at 160° C. Reacted with formaldehyde and NaOH catalyst as described in Example 1, the resin gelled in 8 minutes at 100° C. The distillate was crystallized from a mixture of acetic acid and benzene. Three different isomeric crystalline products were obtained. The lower melting isomer had a M. P. 114–115° C. and the tautomeric structure:

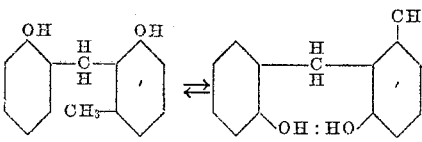

and was identified as 2,2'-dihydroxy-6'-methyl diphenyl methane. This methane has two open para positions and two open ortho positions, but also has a methyl group interfering with the hydrogen bonding process. It reacts with hexamethylenetetramine in 90 seconds at 160° C. to yield an infusible mass and with formaldehyde under the conditions described in Example 1 to a gelled mass in 6.4 minutes at 100° C. Thus the methyl interference is more definite in the hexamethylenetetramine system than in the formaldehyde alkaline water system. The medium melting point isomer is 2,4'-dihydroxy-2'-methyl diphenyl methane having the structure:

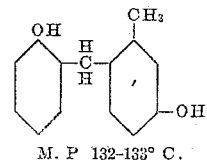

M. P. 132–133° C.

It heat-hardens with 15% by weight of hexamethylenetetramine to an infusible mass in 260 seconds at 160° C. It hardens to a gelled mass in 17 minutes at 100° C. when reacted with formaldehyde and caustic catalyst under the conditions described in Example 1.

The higher melting isomer is 2,2'-dihydroxy-4'-methyl diphenyl methane having a M. P. 136–137° C. and the tautomeric structure:

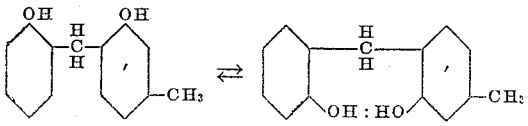

It reacts with 15% by weight of hexamethylenetetramine to yield an infusible resin in 55 seconds at 160° C. When reacted with formaldehyde and caustic catalyst as described in Example 1, it yields an infusible resin in 6 minutes at 100° C. Here the methyl group meta to an hydroxyl results in increase of hexamethylenetetramine hardening speed.

*Example 4*

The monophenol, 1,3,5-meta xylenol, is known to react with formaldehyde more rapidly than phenol itself in these resin producing reactions.

Saligenin, 24.8 grams, was reacted with 1,3,5-meta xylenol, 122. grams, for 30 minutes at 160–170° C.; the reacted mixture was then distilled under reduced pressure. After unreacted meta xylenol was removed, a fraction having a B. P. 187–195° C. at 1 mm. was obtained in 34.6 grams yield (76%). This distillate crystallized from a 60% acetic acid 40% water mixture gave about 80% of its weight as crystals having a M. P. 139–140° C. and 20% as crystals having a M. P. 164–165° C. The lower melting isomer is 2,2'-dihydroxy-4'6'-dimethyldiphenyl methane having the structure:

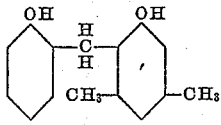

Proof of this structure is derived from the fact that the compound gave a xanthene having a M. P. 45–46° C. on pyrolysis. The compound when reacted with 15% by weight of hexamethylenetetramine yielded a resin which hardened to infusibility in 300 seconds at 160° C. Here the 6' methyl group is causing great interference with heat-hardening as may be shown by comparison with the 55 second speed of 2,2'-dihydroxy-4'-methyldiphenyl methane of Example 3.

This new chemical reacted with formaldehyde and caustic under conditions described in Example 1, formed a liquid resin which heat-hardened in 2.4 minutes at 100° C. This chemical is similar in speed of resin formation with formaldehyde to resorcinol-formaldehyde reaction mixtures and may be used as a substitute for resorcinol in the production of room-temperature hardening resins.

The higher melting isomer, M. P. 164–165° C. has the structure:

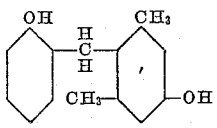

and was identified as 2,4'-dihydroxy-2',6'-dimethyldiphenyl methane. When reacted with 15% by weight of hexamethylenetetramine it formed a resin which heat-hardened in 780 seconds at 160° C. In the reaction with formaldehyde using the caustic soda as a catalyst (procedure described in Example 1) it yielded a liquid resin which gelled when heated for 7 minutes at 100° C. This compound did not give a xanthene on pyrolysis.

*Example 5*

Saligenin was reacted with para tertiary butyl phenol under the conditions of Example 2. Only one isomer is possible and only one product was obtained, which was 2,2'-dihydroxy-5'-tertiary butyl diphenyl methane having a M. P. 91–92° C. and the structure:

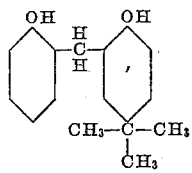

When reacted with 15% by weight of hexamethylenetetramine, it yielded a resin which heat-hardened to infusibility in 360 seconds at 160° C. In reaction with formaldehyde and caustic at 100° C. as described in Example 1 the resultant liquid resin gelled when heated for 22 minutes at 100° C.

*Example 6*

Saligenin 12.4 grams was reacted with 62.0 grams of 3-methoxy phenol by heating the mixture for 30 minutes at 160–170° C. The reacted mixture was distilled, collecting the fraction 192–205° C. at 1 mm. of 15.5 grams (67.5% yield) as a resinous liquid.

This liquid when reacted with 15% by weight of hexamethylenetetramine produced a resin which set in 80 seconds at 160° C. and when reacted with formaldehyde as described in Example 1 it yielded a gelled resin in 12 seconds at 100° C.

The liquid is a mixture of isomers having the structures:

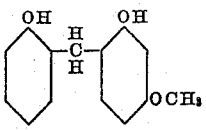

and

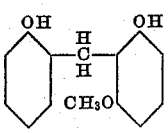

and

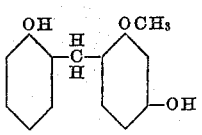

The distillable liquid is of interest as a heat hardening resin intermediate.

*Example 7*

The presence of an additional hydroxy group in ortho and para positions in the monocyclic phenols reacted with saligenin gave new chemicals of rapid formaldehyde and hexamethylenetetramine reaction rate and of interest for resin formation. Saligenin 12.4 grams and resorcinol 55 grams were reacted and the product distilled to give a fraction distilling at 235–245° C. at 1 mm. mercury pressure with a yield of 15.6 grams=(72.3%). Crystals of 2,2',6'-trihydroxydiphenyl methane with a M. P. 203–204° C. were obtained from the distillate. Structure of the crystals is indicated as:

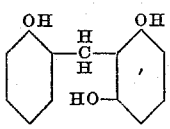

The crystals were reacted with formaldehyde and hexamethylenetetramine as described in Example 1. With hexamethylenetetramine, the resultant resin heat-hardened in 10 seconds at 160° C. With formaldehyde the resultant resin gelled in 36 seconds at 100° C.

Thus this chemical can well substitute for resorcinol in resin production in view of resorcinol-formaldehyde test speeds of about 20 seconds at 100° C.

*Example 8*

Salignenin 12.4 grams and orcinol 62 grams were heated 30 minutes at 160–170° C. and the reaction mixture was then distilled. A distillate at 240–260° C. at 1 mm. was obtained in the amount of 14.1 grams (61.3% yield). This was recrystallized to crystals having a M. P. of 224–225° C. which was identified as 2,2',6'-trihydroxy-4'-methyldiphenyl methane, having the structure:

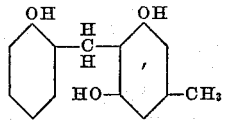

The hexamethylenetetramine reaction speed with these crystals as in Example 1 was 10 seconds at 160° C. Formaldehyde reaction speed as in Example 1 was 20 seconds at 100° C.

Thus this chemical has the same high speed as resorcinol for resin uses.

*Example 9*

A mixture was made consisting of hydroquinone, 110 grams (1 mole), saligenin, 24.8 grams (0.2 mole) and diisobutyl ketone, 100 grams (as solvent). This mixture was heated under reflux conditions to a temperature of 165–170° C. for thirty minutes. The unreacted hydroquinone and the solvent were distilled off under reduced pressure to a pot temperature of 250° C. at 0.280 mm. pressure. The residue (yield 33.7 grams) was reacted with hexamethylenetetramine and exhibited a gel time at 160° C. of 36 seconds. This residue was distilled, the vapor coming over at 215–235° C. at 0.6 to 0.7 mm. condensing as a viscous liquid. A crude batch of crystals was separated from a toluene solution of the viscous liquid; the crystals had a M. P. of 125–129° C. and were identified as 2,2′,5′-trihydroxy diphenyl methane. The liquid was reacted with hexamethylenetetramine (15% by weight); it became an infusible resin in 38 seconds at 160° C. The liquid with formaldehyde as described in Example 1 produced an infusible gel in 18 minutes at 100° C.

*Example 10*

Crotyl phenol, 148.2 grams (1.0 mole) and seligenin, 24.8 grams (0.2 mole) were heated together at 260–170° C. for 40 minutes and distilled under reduced pressure to remove unreacted crotyl phenol. The yield was 35.6 grams. A portion of the residue reacted with 15% by weight of hexamethylenetetramine exhibited a gel time of 62 seconds at 160° C. The residue was distilled, yielding a liquid which boiled at 165–175° C. and at 0.1–0.12 mm. pressure. The liquid had a refractive index of 1.5890 at 25° C., a molecular weight of 251 (theory for diphenyl 254), and was identified as 2,2′-dihydroxy-3′-crotyl diphenyl methane. This isomer reacted with 15% by weight of hexamethylenetetramine gave a gel time of 250 seconds at 160° C., and when reacted with formaldehyde as in Example 1 using NaOH catalyst at 100° C. the reaction product gelled within 20 minutes at the reaction temperature.

A higher boiling product was left as a residue and this on reaction with 15% by weight of hexamethylenetetramine heat-hardened to infusibility in 36 seconds at 160° C.

*Example 11*

Cardanol, 263 grams (contains 5.0 grams residue) (1 mole) and saligenin 24.8 grams (0.2 mole) were heated at 160–170° C. for thirty minutes and unreacted cardanol was then distilled off under reduced pressure. The residue yield 77.7 grams was equivalent to the theoretical diphenylol plus some residue from the cardanol itself. This residue tested for hexamethylenetetramine gel time gave 129 seconds at 160° C. and retested at 200° C. gave an infusible product in 29 seconds. The residue tested with 5% NaOH and formaldehyde, as in Example 1 gave an infusible resin in 8 minutes at 100° C.

The residue tested for molecular weight gave a value of 680 which was higher than the theoretical value of 368 for the diphenylol and hence indicates the presence of a polymer in the residue.

*Example 12*

Phenol, 629 grams, 6.7 moles, formalin 37%, 81 grams, 1 mole and zinc oxide, 1.5 grams, were heated to reflux (113–115° C.) for 2.5 hours; then unreacted phenol was removed by distillation under reduced pressure of about 10 to 20 mm. pressure, keeping the temperature at 60–65° C. as the mass approached the phenol free condition. The residue 120 grams was by test 60% of saligenin crystals but difficult to purify. To this residue 586 grams of para cresol were added and the mass then heated to 160° C. for thirty minutes. Unreacted para cresol was removed by distillation under reduced pressure; then the residue resin (yield 226 grams) was reacted with 15 percent by weight of hexamethylenetetramine at 160° C. The reaction mixture hardened to infusibility in 150 seconds. Reacted with formaldehyde and NaOH catalyst as in Example 1, the resultant resin became infusible in 21 minutes at 100° C. The residue was distilled at 1 mm. pressure and 130 grams of distillate obtained; the distillate crystallized from dilute acetic acid yielding crystals of M. P. 96–97°. The crystals were identified as 2,2′-dihydroxy-5′-methyl diphenyl methane, identical with the compound of Example 2.

*Example 13*

Ortho cresol, 108 grams (1 mole) and saligenin 24.8 grams (0.2 mole) were heated at 155–160° C. for one hour. Then unreacted ortho cresol was removed under reduced pressure, leaving as a residue 39.6 grams (92.5% theory). This residue on test with 15% by weight of hexamethylenetetramine heat-hardened at 160° C. in 84 seconds. The residue was soluble in an equal weight of tung oil at room temperature. The residue was distilled; the fraction distilling at 158–162° C. and at 0.15 mm. pressure amounted to 17.4 grams of 2,2′-dihydroxy-3′-methyl diphenyl methane. This fraction 9.5 grams (.044 mole) was mixed with formalin, 37% solution, 1.82 grams (.022 mole) and 0.09 gram ZnO as a catalyst. The mixture was heated at 105–110° C. for 4 hours and the fusible novolak resin formed in the reaction mass was dehydrated to 180° C. The dehydrated resin was dissolved in acetone for removal of the catalyst by filtration. The acetone was then distilled off to yield 9.3 grams of residue resin. This was a clear, light colored, grindable and fusible resin. It dissolved easily in oils such as tung oil.

The effect of the resin on gelation of tung oil was examined. Tung oil alone heat-gelled at 250° C. in 35 minutes.

1.0 gram oil + 0.1 gram resin gelled in 37 minutes at 250° C.

1.0 gram oil + 0.5 gram resin gelled in 38 minutes at 250° C.

1.0 gram oil + 0.1 gram distillate (158–162° C. fraction) gelled in 43 minutes at 250° C.

A tung oil varnish was made from the novolak resin by heating for 40 minutes at 230–250° C. a mixture of 5.0 grams of the resin and 9.8 grams of the tung oil. The solution of resin and oil was then thinned with 10 grams of solvent (Varsol-xylene mixture). A mixture of driers consisting of lead naphthenate, cobalt octoate and manganese naphthenate was added to the thinned solution in amount to provide as metal, 0.3% of lead, 0.3% cobalt, and 0.01% manganese on the solids of the solution. The varnish with the described driers when brushed on glass, metal or wood surfaces dried in 4 hours to a non-tacky film.

The varnish when baked at 160° C. produced a soft gel in 35 seconds. Baked on tin plate it was nearly acetone resistant in 30 minutes at 135° C.

*Example 14*

A sample of tung oil was tested at 250° C. to have a gelation time of 38 to 39 minutes. To the same oil 10% by weight of various diphenylols was added and the mixtures tested at 250° C. for gelation time.

| Compound | Time to gel at 250° C. |
|---|---|
| | Min. |
| Tung Oil +2,2′-dihydroxy-5′-tertiary butyl diphenyl methane | 46 |
| Tung Oil +2,2′-dihydroxy-3′-crotyl diphenyl methane | 45 |
| Tung Oil +2,2′,6′-trihydroxydiphenyl methane | 45 |
| Tung Oil +2,4′-dihydroxy-2′-methyl diphenyl methane | 35 |

*Example 15*

A mixture consisting of 176 grams paracyclohexyl phenol (1 mole) and 24.8 grams saligenin (0.2 mole) was heated for 30 minutes at 165°–170° C. while removing water of reaction. Unreacted paracyclohexyl phenol was then removed from the reaction mass by distillation at subatmospheric pressure, leaving a residue of 50 grams (89% yield). The residue was then distilled at 0.35 mm.

pressure and at 200°–215° C. resulting in a distillate of 34 grams (60% yield) and a residue of 15 grams. The distillate crystallized and was purified by recrystallization from aqueous 65% acetic acid. The recrystallized product was identified as 2,2'-dihydroxy-5'-cyclohexyl-diphenyl methane; M. P. 143°–145° C. and having the structural formula:

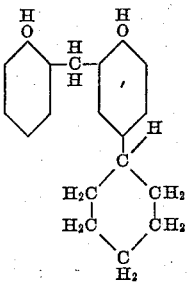

The crystalline 2,2'-dihydroxy-5'-cyclohexyldiphenyl methane admixed with 15 percent by weight of hexamethylenetetramine reacted to an infusible resinous mass in 315 seconds on a hot plate surface held at 160° C. This methane reacted with formaldehyde as described in Example 1 produced a viscous resin which gelled in 25 minutes at 100° C.

*Example 16*

A mixture consisting of 146.5 grams paraphenyl phenol (0.86 mole) and 21.1 grams saligenin was reacted by heating for 30 minutes at 160°–170° C. Then water of reaction and unreacted paraphenyl phenol were removed from the reaction mass by distillation at subatmospheric pressure. The residue yield was 45.7 grams (96.3% theoretical). A portion of the residue was mixed with 16.9 percent by weight of hexamethylenetetramine and heated on a hot plate maintained at 160° C. The mixture reacted to an infusible resin in 110 seconds on the hot plate. The remainder of the residue was distilled, the fraction distilling at 2.5 mm. pressure and at 240°–250° C. amounting to 19.4 grams, equivalent to a 45.9% yield on the theoretical unsymmetrical diphenylol condensation product. The distillate crystallized from dilute aqueous acetic acid; the resultant crystals were identified as 2,2'-dihydroxy-5'-phenyldiphenyl-methane, M. P. 143–146° C. and having the structure:

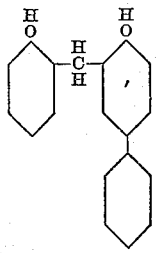

The crystalline distillate was reacted with 16.9 percent by weight of hexamethylenetetramine at 160° C., yielding a gelled resin in 290 seconds at this temperature. The residue from the last distillation was also tested with 16.9 percent by weight of hexamethylenetetramine and at 160° C. yielded a resinous gel in 50 seconds.

It is evident from the disclosures made in the above examples, that the described unsymmetrical diphenylol methanes having at least one reactive ortho or para position on the substituted phenyl ring are reactive with aldehydes and with methylene engendering compounds such as hexamethylenetetramine to yield thermosetting resins. The hardening speeds to infusible masses of such resins are dependent upon the diphenylol used and its radicals and their positions on the substituted phenyl ring. While formaldehyde followed by benzaldehyde and furfuraldehyde are the most reactive aliphatic aldehydes for reaction with the unsymmetrical diphenylol methanes, other aldehydes such as butyraldehyde, valeraldehyde, acetaldehyde and the like can be reacted with these diphenylols to yield resinous materials.

In general, unsymmetrical diphenylol methanes react more slowly with hexamethylenetetramine than do the respective unsubstituted, symmetrical, diphenylol methanes such as 2,2'-dihydroxy diphenyl methane, 2,4'-dihydroxy diphenyl methane and 4,4'-dihydroxy diphenyl methanes. The slower and controllable hardening speeds of resins made from the unsymmetrical diphenylol methanes are of particular advantage in the use of the resins for molding under heat and pressure large structures involving mold charges in the order of 10 pounds or more of molding material. Under such conditions, the temperature caused by exothermic heat developed in the resins while heat-hardening is considerably less than with conventional thermosetting phenol-formaldehyde resins, whereby the center sections of large molded objects are not charred because the exothermic heat developed is radiated or dissipated as rapidly as formed. In contrast, actual explosions have been known to occur when conventional thermosetting phenol-formaldehyde resins were used in too thick a section for proper dissipation of exothermic heat resulting from the rapid reaction of these resins at curing temperatures.

Conversely in the production of large laminated structures with conventional thermosetting phenol-aldehyde resins as the binder for the plies of paper or cloth, there is a tendency for the binder in the outside plies to partially decompose before the center sheets have been brought up to temperature. Formaldehyde resins from unsymmetrical diphenylol methanes by curing more slowly avoid or alleviate this problem by enabling the inner plies to attain heat-hardening temperatures for the resin binder before considerable heat advancement has taken place in the resin binder in the outer plies.

The unsymmetrical diphenylol methanes are soluble in fatty oils such as linseed oil, soya bean oil, tung oil and the like. Upon heating the unsymmetrical diphenylol methanes in admixture with fatty oil at temperatures above the melting point of the methanes, a clear solution results which is generally stable at room temperatures, particularly in the instance of the diphenylols having alkyl, alkoxy or alkenyl groups. The compounds therefore find utility in the production of oleo-resinous coating compositions. Moreover the unsymmetrical compounds do not prevent the normal bodying action of the fatty oil as by partial oxidation or polymerization during the conventional cooking operation in the preparation of oleo-resinous coating compositions.

The unsymmetrical diphenylol methanes can be reacted with aldehydes such as formaldehyde, in such molar proportions as to yield novolak type resins or slowly heat-hardenable types, either of which is also soluble in fatty oils for the production of air drying and baking coating compositions.

What is claimed is:

1. A mixed condensation reaction product of saligenin and a phenol having at least one reactive position and attached to the phenolic ring in addition to the phenolic hydroxyl group at least one more monovalent radical selected from the group consisting of alkyl, cycloalkyl, aryl, alkenyl, alkoxy and hydroxy, said reaction product comprising an unsymmetrical diphenylol methane having the structure:

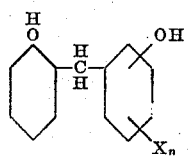

wherein the OH group of the X substituted ring is attached to one of the positions 2, 4, and 6, relative to the nuclear carbon atom directly attached to the methylene carbon atom, and a novolak resin having the structure:

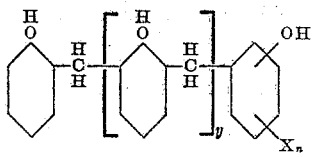

where $y$ in the structure for the novolak is an integer from 1 to about 40, X in each of said structures is a monovalent radical selected from the group consisting of alkyl, cycloalkyl, aryl, alkenyl, alkoxy and hydroxy, and $n$ in each of said structures is a whole number from 1 to 4.

2. A mixed condensation reaction product according to claim 1 wherein the phenol reacted with the saligenin is an alkyl substituted phenol.

3. A mixed condensation reaction product according to claim 1 wherein the phenol reacted with saligenin is an aryl substituted phenol.

4. A mixed condensation reaction product according to claim 1 wherein the phenol reacted with saligenin is 5. Method of preparing an unsymmetrical diphenylol methane which comprises reacting at a temperature between 100° C. and 200° C. and in the presence of a catalyst selected from the group consisting of the oxides, hydroxides and organic salts of the alkaline earth metals, alkali metals and the amphoteric metals zinc, aluminum, and magnesium, a reaction mixture of a molar quantity of saligenin and between about three to 10 moles of a phenol having at least one reactive position and attached to the phenolic ring in addition to the phenolic hydroxyl group, at least one more monovalent radical selected from the group consisting of alkyl, cycloalkyl, aryl, alkenyl, alkoxy and hydroxy, and removing water formed during the condensation reaction.

6. Method of preparing unsymmetrical diphenylol methanes, which comprises reacting at a temperature between 100 and 200° C. saligenin with more than a molar quantity of a phenol having at least one reactive position and attached to the phenolic ring in addition to a phenolic hydroxyl group at least one more monovalent radical selected from the group consisting of alkyl, cycloalkyl, aryl, alkenyl, alkoxy, and hydroxy.

7. Method of preparing unsymmetrical diphenylol methanes, which comprise reacting at a temperature between 100° C. and 200° C. and a pH between 4 and 7 a mixture comprising saligenin and an excess molar quantity of a phenol having at least one reactive position and attached to the phenolic ring in addition to a phenolic hydroxyl group at least one more monovalent radical selected from the group consisting of alkyl, cycloalkyl, aryl, alkenyl, alkoxy and hydroxy and removing water formed during the condensation.

References Cited in the file of this patent
UNITED STATES PATENTS

| | | |
|---|---|---|
| 1,614,171 | Amann et al. | Jan. 11, 1927 |
| 2,057,690 | Moss | Oct. 20, 1936 |
| 2,058,797 | Honel | Oct. 27, 1936 |
| 2,074,993 | Sibley | Mar. 23, 1937 |
| 2,075,144 | Schneider | Mar. 30, 1937 |
| 2,079,210 | Honel | May 4, 1937 |
| 2,440,909 | Niederl | May 4, 1948 |

OTHER REFERENCES

Morgan et al.: "Journal of the Society of Chemical Industry," Transactions (London), vol. 52 (1933), pp. 418T–424T.

Mason et al.: "The Technology of Plastics and Resins," D. Van Nostrand Co. Inc., New York (1945), pp. 163–172.

Wakeman: "The Chemistry of Commercial Plastics," Reinhold Publishing Corp., New York (1947), pp. 115–118.